US012712116B2

(12) United States Patent
Lee et al.

(10) Patent No.: US 12,712,116 B2
(45) Date of Patent: Aug. 18, 2026

(54) COUPLED INDUCTOR

(71) Applicant: CYNTEC CO., LTD., Hsinchu (TW)

(72) Inventors: Chi-Hsun Lee, Taipei City (TW); Min-Feng Chung, Taichung City (TW)

(73) Assignee: CYNTEC CO., LTD., Hsinchu (TW)

( * ) Notice: Subject to any disclaimer, the term of this patent is extended or adjusted under 35 U.S.C. 154(b) by 143 days.

(21) Appl. No.: 17/884,540

(22) Filed: Aug. 9, 2022

(65) Prior Publication Data

US 2022/0384088 A1 Dec. 1, 2022

Related U.S. Application Data

(63) Continuation of application No. 16/231,415, filed on Dec. 22, 2018, now Pat. No. 11,462,351.

(60) Provisional application No. 62/610,153, filed on Dec. 23, 2017.

(51) Int. Cl.

| | |
|---|---|
| ***H01F 27/28*** | (2006.01) |
| ***H01F 3/10*** | (2006.01) |
| ***H01F 5/04*** | (2006.01) |
| ***H01F 17/04*** | (2006.01) |
| ***H01F 27/02*** | (2006.01) |
| ***H01F 27/29*** | (2006.01) |
| ***H01F 27/38*** | (2006.01) |

(52) U.S. Cl.

CPC ........... *H01F 27/2866* (2013.01); *H01F 3/10* (2013.01); *H01F 5/04* (2013.01); *H01F 17/045* (2013.01); *H01F 27/022* (2013.01); *H01F 27/29* (2013.01); *H01F 27/38* (2013.01); *H01F 2003/106* (2013.01)

(58) Field of Classification Search

CPC .......... H01F 27/2866; H01F 3/10; H01F 5/04; H01F 17/045; H01F 27/022; H01F 27/29; H01F 27/38; H01F 2003/106; H01F 2003/103; H01F 27/24; H01F 17/04; H01F 27/306

See application file for complete search history.

(56) References Cited

U.S. PATENT DOCUMENTS

| | | | | | |
|---|---|---|---|---|---|
| 8,723,629 | B1 * | 5/2014 | Liu | H01F 1/14791 | 336/212 |
| 2006/0290458 | A1 * | 12/2006 | Sano | H01F 3/12 | 336/212 |
| 2009/0278652 | A1 * | 11/2009 | Shoji | H01F 38/08 | 336/221 |
| 2014/0097927 | A1 * | 4/2014 | Yamamoto | H01F 27/255 | 336/200 |
| 2015/0302968 | A1 * | 10/2015 | Lin | H01F 27/24 | 336/83 |

(Continued)

FOREIGN PATENT DOCUMENTS

| | | | |
|---|---|---|---|
| JP | 07220950 | * | 8/1995 |
| JP | 2003-243228 | * | 8/2003 |

*Primary Examiner* — Mang Tin Bik Lian

(74) *Attorney, Agent, or Firm* — CKC & Partners Co., LLC

(57) ABSTRACT

A coupled inductor has two pillars that are aligned in a vertical direction, wherein a first coil and a second coil are respectively wound around one of the two pillars, respectively, wherein the bottom surface of winding turns of the first coil and the bottom surface of winding turns of the second coil are separated by a gap, wherein a magnetic material is disposed in the gap and a straight line that is enclosed by each of the first coil and the second coil passes through the two pillars.

9 Claims, 17 Drawing Sheets

(56) References Cited

U.S. PATENT DOCUMENTS

| | | | | |
|---|---|---|---|---|
| 2015/0302969 | A1* | 10/2015 | Aaron | H01F 27/245<br>716/112 |
| 2016/0049881 | A1* | 2/2016 | Ackermann | H01F 17/06<br>363/126 |
| 2016/0086725 | A1* | 3/2016 | Igarashi | H01F 27/2823<br>336/83 |
| 2016/0247627 | A1* | 8/2016 | Baker | H01F 27/2823 |
| 2018/0323145 | A1* | 11/2018 | Kirby | H01L 23/481 |
| 2019/0066904 | A1* | 2/2019 | Chang | H01F 41/043 |

* cited by examiner

COUPLED INDUCTOR

CROSS-REFERENCES TO RELATED APPLICATIONS

This application is a continuation of U.S. patent application Ser. No. 16/231,415 filed on Dec. 22, 2018, which claims the benefit of U.S. Provisional Patent Application No. 62/610,153 filed on Dec. 23, 2017, each of which is hereby incorporated by reference herein and made a part of the specification.

BACKGROUND OF THE INVENTION

I. Field of the Invention

The present invention relates to a coupled inductor, and in particular to, an inverse-coupling coupled inductor.

II. Description of Related Art

A conventional coupled inductor has two laterally-placed pillars, wherein a coil is wound on each of the two laterally-placed pillars. Such a design sacrifices the volume of magnetic material to achieve the desired coefficient value, and as a result is it is not suitable for a design that requires a smaller size. In addition, because the central layer is made of non-magnetic materials, flux leakage can occur from one side of the conventional coupled inductor, which will increase EMI. The coupled inductor is widely used in multiphase Buck/Boost circuits, however, the conventional coupled inductor will cause multiphase Buck/Boost circuits to have slower dynamic speed response, that is, slower transient response speed.

Therefore, a better solution is needed to resolve the above-mentioned issues.

SUMMARY OF THE INVENTION

The present invention provides a coupled inductor having two vertically stacked pillars for winding two coils so as to reduce the size of the coupled inductor while increasing the efficiency of the coupled inductor.

The present invention provides an inverse-coupling coupled inductor for use in multiphase Buck/Boost circuits, wherein the inverse-coupling coupled inductor can help the multiphase Buck/Boost circuits to achieve a faster dynamic speed response, that is, a faster transient response speed.

In one embodiment, a coupled inductor is disclosed, wherein the coupled inductor has two pillars that are aligned in a vertical direction, wherein a first coil, and a second coil are respectively wound around one of the two pillars, respectively, wherein the bottom surface of winding turns of the first coil and the top surface of winding turns of the second coil are separated by a gap, wherein a magnetic material is disposed in the gap and a straight line that is enclosed by each of the first coil and the second coil passes through the two pillars.

In one embodiment, a coupled inductor is disclosed, wherein the coupled inductor comprises: a first coil, comprising at least one first winding turn of a first conductive wire; and a second coil, comprising at least one second winding turn of a second conductive wire, wherein the at least one first winding turn of the first conductive wire and the at least one second winding turn of the second conductive wire are respectively wound around a first pillar and a second pillar, wherein the bottom surface of the at least one first winding turn and the top surface of the at least one second winding turn are separated by a first gap, wherein a magnetic material is disposed in the first gap, and a straight line that is enclosed by each of the first coil and the second coil passes through the first pillar and the second pillar, that is, the straight line passes through the hollow space of each of the first coil and the second coil.

The first pillar and the second pillar can be placed along a vertical direction or along a horizontal direction, in either way to place the pillars, a straight line that is enclosed by each of the first coil and the second coil will pass through the first pillar and the second pillar, that is, the straight line passes through the hollow space of each of the first coil and the second coil.

In one embodiment, the first coil and the second coil are inversed coupled and the coefficient of coupling (hereinafter referred to as K) of the first coil and the second coil has a negative value.

In one embodiment, K is in the range: −0.4 to −0.8.

In one embodiment, K is in the range: −0.45 to −0.55.

In one embodiment, the axis of the first pillar and the axis of the second pillar have a distance therebetween and the distance is no more than 0.2 mm.

In one embodiment, the axis of the first pillar and the axis of the second pillar have a distance therebetween and the distance is no more than 0.1 mm.

In one embodiment, the axis of the first pillar and the axis of the second pillar are substantially aligned along a vertical direction.

In one embodiment, both of the axis of the first pillar and the axis of the second pillar are on a same straight line.

In one embodiment, a magnetic body encapsulates the first coil, the second coil, the first pillar and the second pillar.

In one embodiment, the first pillar and the second pillar are integrally formed with a magnetic plate as a T-core, and the at least one first winding turn of the first conductive wire and the at least one second winding turn of the second conductive wire, and the T-core are encapsulated by a magnetic body.

In one embodiment, the first pillar and the second pillar are integrally formed with a magnetic body that encapsulates the at least one first winding turn of the first conductive wire and the at least one second winding turn of the second conductive wire.

In one embodiment, the first pillar and the second pillar have a second gap therebetween, wherein a magnetic material is disposed in the second gap. In one embodiment, a magnetic sheet is disposed in the second gap. In one embodiment, a magnetic glue is disposed in the second gap.

In one embodiment, the magnetic material disposed in the second gap comprises a first magnetic powder and each of the first pillar and the second pillar comprises a second magnetic powder, wherein the average particle size of the first magnetic powder is less than that of the second magnetic powder.

In one embodiment, the first pillar and the second pillar are integrally formed with a magnetic body that encapsulates the at least one first winding turn of the first conductive wire and the at least one second winding turn of the second conductive wire.

In one embodiment, the first pillar and the second pillar are integrally formed with a magnetic body that encapsulates the at least one first winding turn of the first conductive wire, the at least one second winding turn of the second conductive wire and the magnetic sheet.

In one embodiment, the first pillar and the second pillar are integrally formed with a magnetic plate as a T-core, the magnetic sheet, the at least one first winding turn of the first conductive wire and the at least one second winding turn of the second conductive wire, and the T-core are encapsulated by a magnetic body.

In one embodiment, the first pillar is integrally formed with a first magnetic plate as a first T-core, and the second pillar is integrally formed with a second magnetic plate as a second T-core, wherein the magnetic sheet is disposed between the first T-core and the second T-core, wherein the first pillar and the second pillar are located between the first magnetic plate and the second magnetic plate.

In one embodiment, the first coil, the second coil, the first T-core and the second T-core are encapsulated by a magnetic body.

In one embodiment, the first pillar and the second pillar have a second gap therebetween, and the permeability of the magnetic material disposed in the second gap is respectively less than that of the first pillar and the second pillar.

In one embodiment, the permeability of the magnetic material is in the range: 12-18 and the permeability of the first pillar and the second pillar is in the range: 25-45.

In one embodiment, the magnetic material forms a magnetic sheet disposed in the gap.

In one embodiment, the first pillar and the second pillar has a gap therebetween, wherein a magnetic and adhesive material (magnetic glue) is filled in the gap.

In one embodiment, the second pillar and the first magnetic body are integrally formed as a unitary magnetic body.

In one embodiment, the first pillar is integrally formed with a magnetic plate as a first T-core, and the at least one first winding turn of the first conductive wire and the first T-core are encapsulated by a first magnetic body, wherein the second pillar is formed on a top surface of the first magnetic body.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention, the drawings are briefly described as follows.

DESCRIPTION OF EMBODIMENTS

The present invention discloses a coupled inductor, wherein the coupled inductor comprises: a first coil, comprising at least one first winding turn of a first conductive wire; and a second coil, comprising at least one second winding turn of a second conductive wire, wherein the at least one first winding turn of the first conductive wire and the at least one second winding turn of a second conductive wire are respectively wound around a first pillar and a second pillar, respectively, wherein the bottom surface of the at least one first winding turn and the top surface of at least one second winding turn are separated by a first gap, wherein a magnetic material is disposed in the first gap, and a straight line that is enclosed by each of the first coil and the second coil passes through the first pillar and the second pillar, that is, the straight line passes through the hollow space of each of the first coil and the second coil.

There are many ways to form the structure of the coupled inductor the present invention, which will be described hereafter.

Figure 1A:
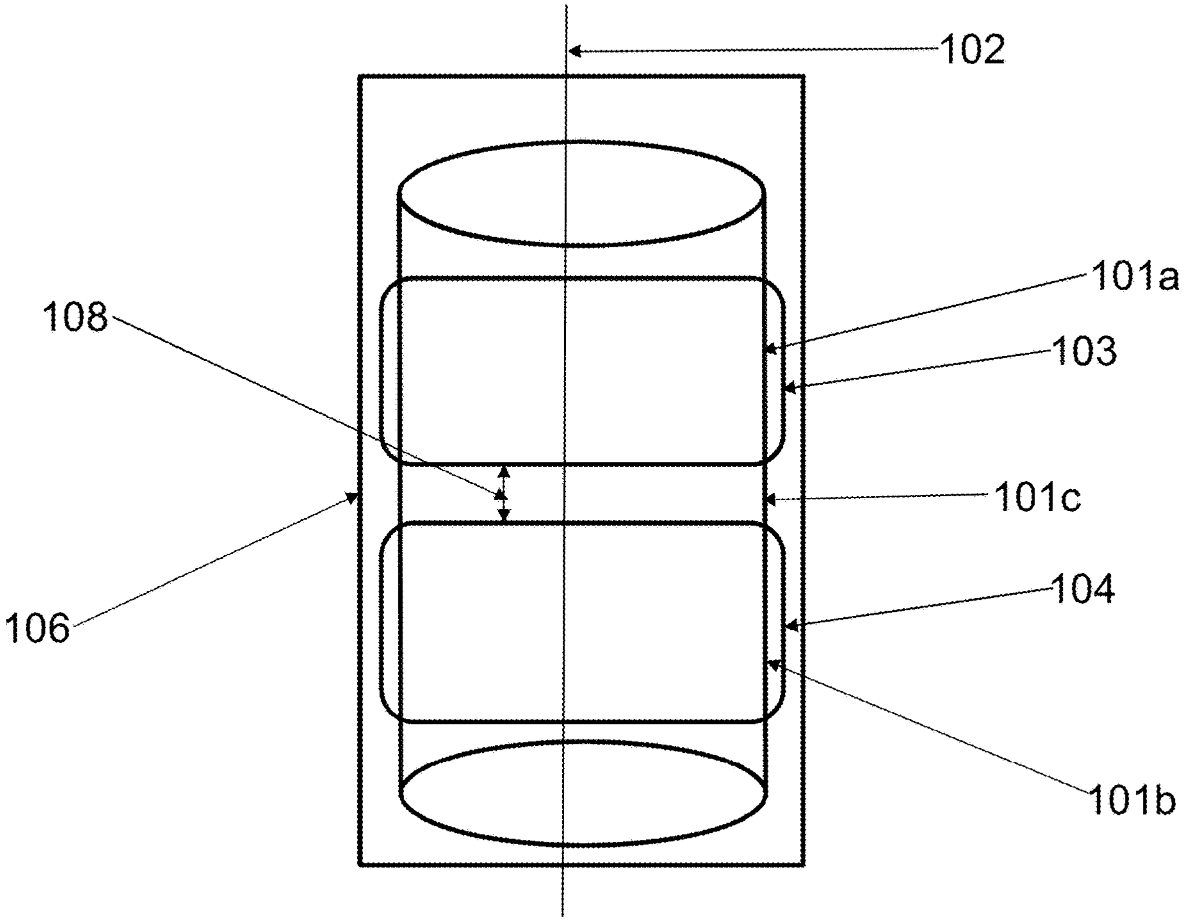
FIGS. 1A-1D each shows a view of a coupled inductor according to one embodiment of the present invention.

FIG. 1A shows a view of a coupled inductor according to one embodiment of the present invention. As shown in FIG. 1A, the coupled inductor comprises a first coil, comprising at least one first winding turn of a first conductive wire 103; and a second coil, comprising at least one second winding turn of a second conductive wire 104, wherein the at least one first winding turn of the first conductive wire 103 and the at least one second winding turn of a second conductive wire 104 are respectively wound around a first pillar 101*a* and a second pillar 101*b*, respectively, wherein the bottom surface of the at least one first winding turn and the top surface of the at least one second winding turn are separated by a first gap 108, wherein a magnetic material 101*c* is disposed in the first gap and a straight line 102 that is enclosed by each of the first coil and the second coil passes through the first pillar 101*a* and the second pillar 101*b*, that is, the straight line 102 passes through the hollow space of each of the first coil and the second coil. As shown in FIG. TA, the first pillar 101*a* and the second pillar 101*b* are integrally formed such that the middle portion of the pillar 101*c* is disposed in the first gap 108. In one embodiment, the first conductive wire comprises a plurality of first winding turns. In one embodiment, the second conductive wire comprises a plurality of second winding turns. Please note that said pillars are made of a magnetic material and therefore, a magnetic material is disposed in the first gap 108. In one embodiment, a magnetic body 106 encapsulates the at least one first winding turn of the first conductive wire 103 and the at least one second winding turn of a second conductive wire 104 and said pillars.

Figure 1B:
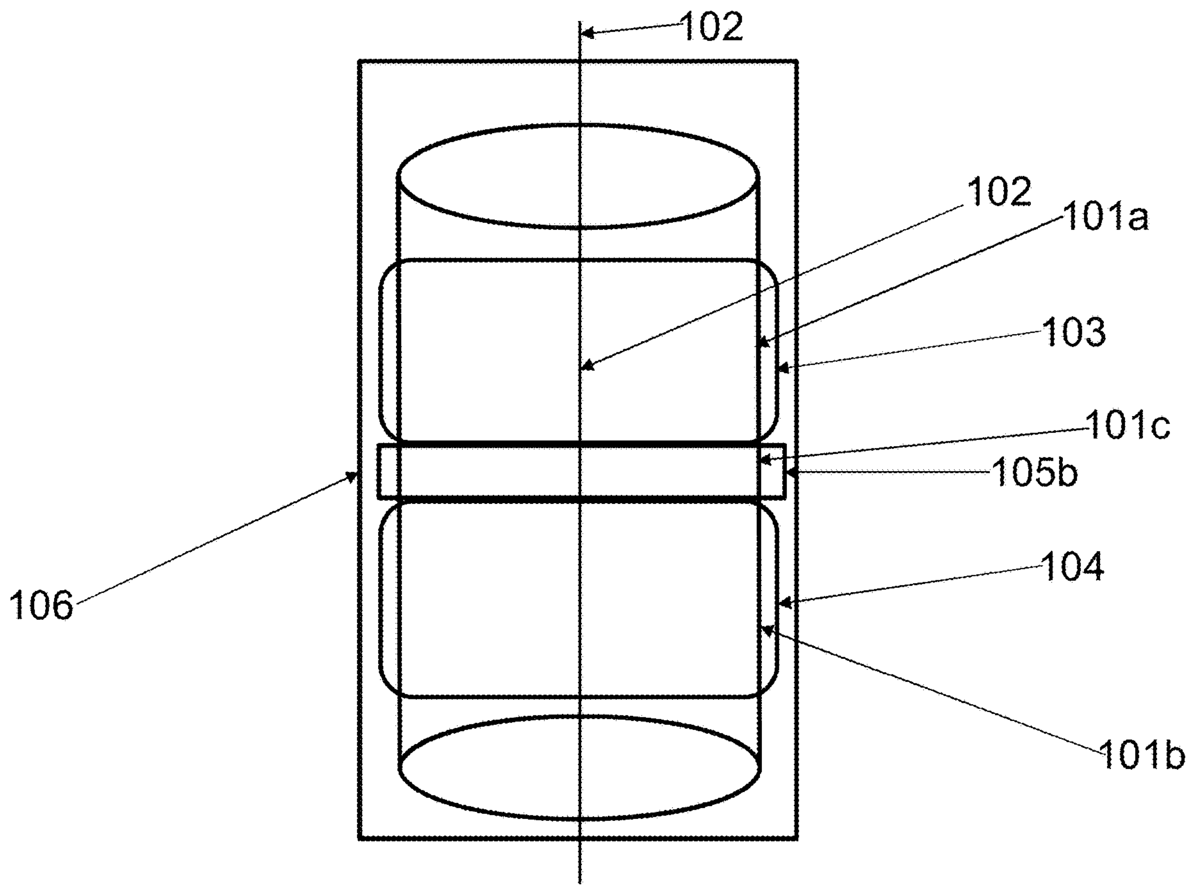

FIG. 1B shows a view of a coupled inductor according to one embodiment of the present invention. As shown in FIG. 1B, the coupled inductor comprises a first coil, comprising at least one first winding turn of a first conductive wire 103; and a second coil, comprising at least one second winding turn of a second conductive wire 104, wherein the at least one first winding turn of the first conductive wire 103 and the at least one second winding turn of a second conductive wire 104 are respectively wound around a first pillar 101*a* and a second pillar 101*b*, respectively, wherein the bottom surface of the at least one first winding turn and the top surface of the at least one second winding turn are separated by a first gap 108, wherein a magnetic material 101*c* is disposed in the first gap and a straight line 102 that is enclosed by each of the first coil and the second coil passes through both of the first pillar 101*a* and the second pillar 101*b*, that is, the straight line 102 passes through the hollow space of each of the first coil and the second coil. As shown in FIG. 1B, a magnetic material 105*b*, in the form of a magnetic sheet or a magnetic glue, surrounds the pillar 101*c* so as to support the at least one second winding turn of a second conductive wire 104 for fixing the height of the first gap 108. In one embodiment, the first conductive wire comprises a plurality of first winding turns. In one embodiment, the second conductive wire comprises a plurality of second winding turns. In one embodiment, a magnetic body 106 encapsulates the at least one first winding turn of the first conductive wire 103, the at least one second winding turn of a second conductive wire 104, the magnetic material 105*b* and said pillars 101*a*, 101*b*.

Figure 1C:
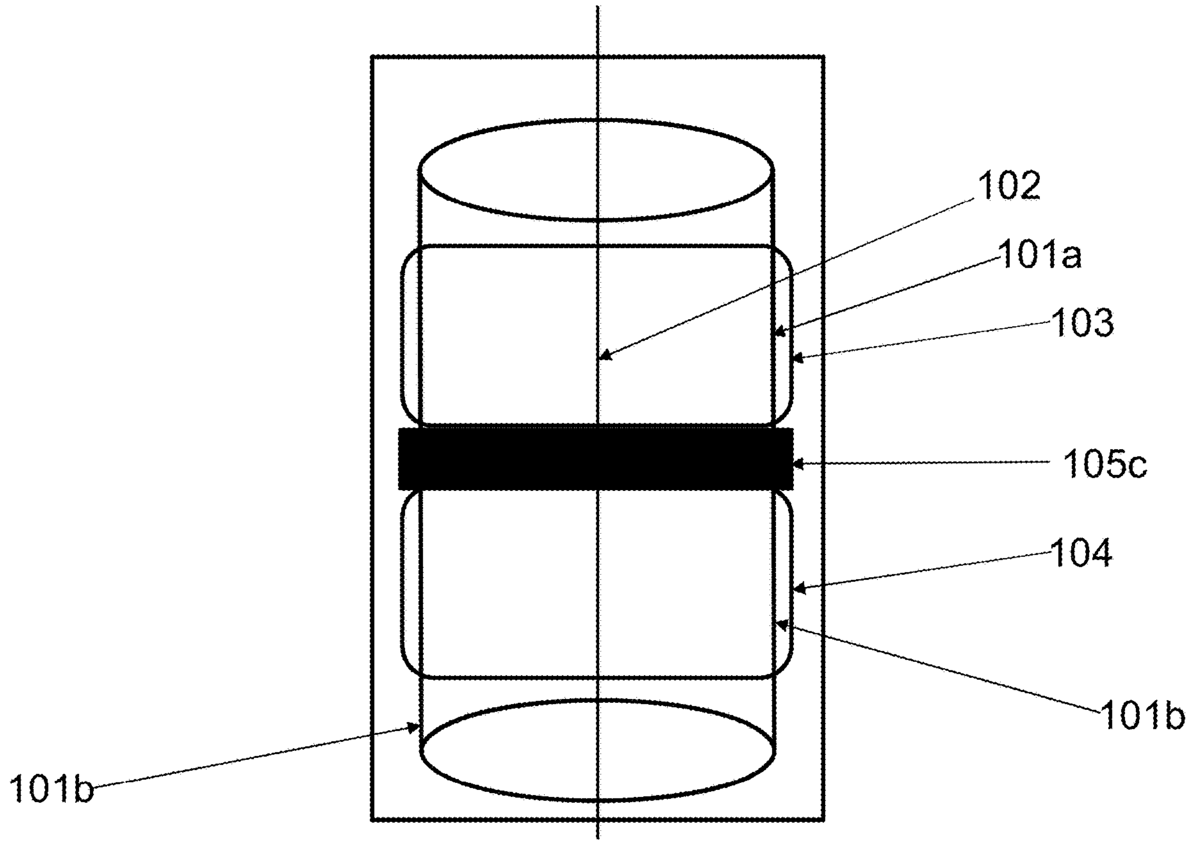

FIG. 1C shows a view of a coupled inductor according to one embodiment of the present invention. As shown in FIG. 1C, the coupled inductor comprises a first coil, comprising at least one first winding turn of a first conductive wire 103; and a second coil, comprising at least one second winding turn of a second conductive wire 104, wherein the at least one first winding turn of the first conductive wire 103 and the at least one second winding turn of a second conductive wire 104 are respectively wound around a first pillar 101*a* and a second pillar 101*b*, wherein the bottom surface of the at least one first winding turn and the top surface of the at least one second winding turn are separated by a first gap 108, wherein a magnetic material 101*c* is disposed in the first gap and a straight line 102 that is enclosed by each of the first coil and the second coil passes through both of the first pillar 101*a* and the second pillar 101*b*, that is, the straight line 102 passes through the hollow space of each of the first coil and the second coil. As shown in FIG. 1C, a magnetic material 105*c*, such as in a form of a magnetic sheet or a magnetic glue, is disposed in the first gap 108. Please note that the first pillar 101*a* and the second pillar 101*b* are separated by a gap so that the magnetic material 105*c*, such as in a form of a magnetic sheet or a magnetic glue, can be disposed between the first pillar 101*a* and the second pillar 101*b* for fixing the height of the first gap 108. In one embodiment, the first conductive wire comprises a plurality of first winding turns. In one embodiment, the second conductive wire comprises a plurality of second winding turns. In one embodiment, a magnetic body 106 encapsulates the at least one first winding turn of the first conductive wire 103, the at least one second winding turn of a second conductive wire 104, the magnetic material 105*c* and said pillars 101*a*, 101*b*.

Figure 1D:
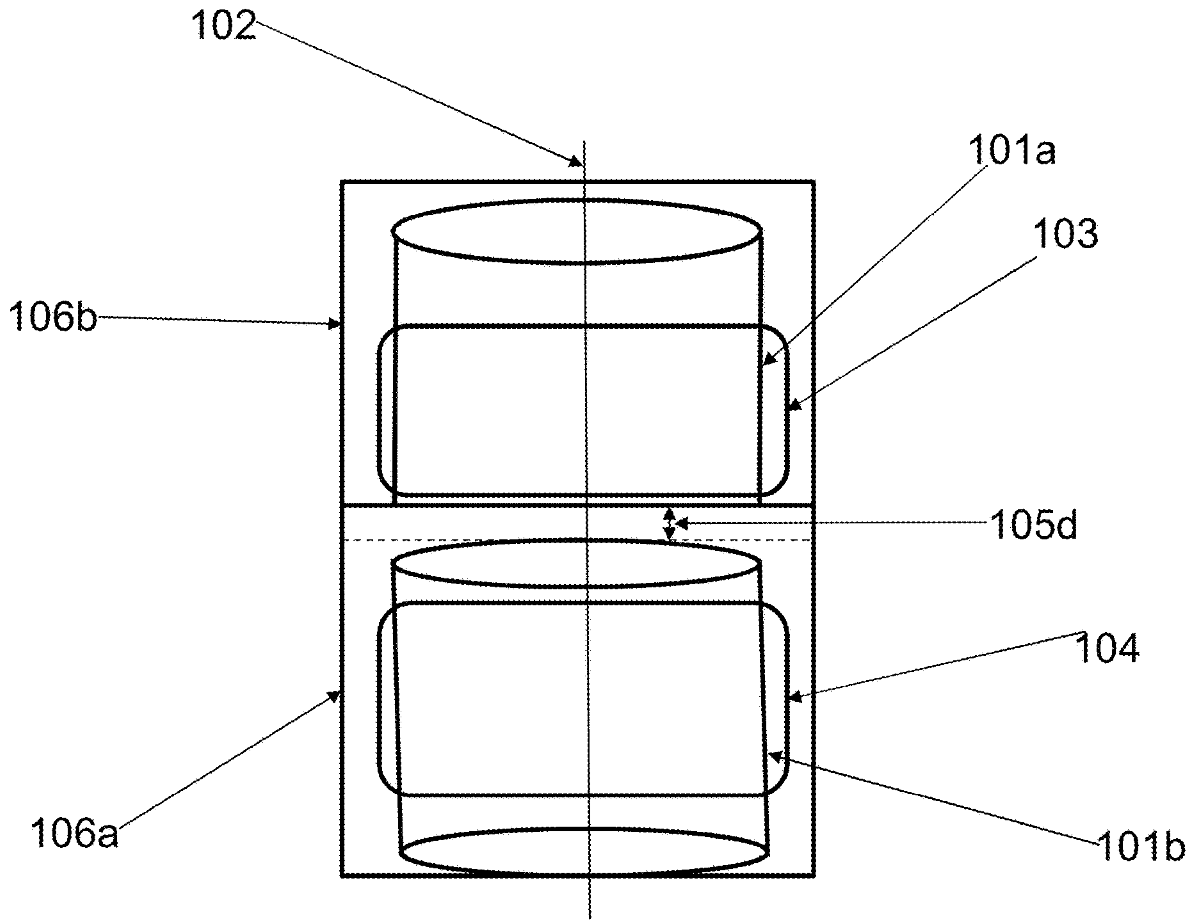

FIG. 1D shows a view of a coupled inductor according to one embodiment of the present invention. As shown in FIG. 1D, the coupled inductor comprises a first coil, comprising at least one first winding turn of a first conductive wire 103; and a second coil, comprising at least one second winding turn of a second conductive wire 104, wherein the at least one first winding turn of the first conductive wire 103 and the at least one second winding turn of a second conductive wire 104 are respectively wound around a first pillar 101*a* and a second pillar 101*b*, respectively, wherein the bottom surface of the at least one first winding turn and the top surface of the at least one second winding turn are separated by a first gap 108, wherein a straight line 102 that is enclosed by each of the first coil and the second coil passes through both of the first pillar 101*a* and the second pillar 101*b*, that is, the straight line 102 passes through the hollow space of each of the first coil and the second coil. As shown in FIG. 1D, a top part 105*d* of a first magnetic body 106*a* made of a magnetic material is disposed in the first gap 108, wherein the first magnetic body 106*a* encapsulates the second pillar 101*b* and the least one second winding turn of a second conductive wire 104, wherein the first pillar 101*a* and the at least one first winding turn of the first conductive wire 103 are located over the top part 105*d* of the magnetic body 106*a*. Please note that the first pillar 101*a* and the second pillar 101*b* are separated by the height of the top part 105*d* of the first magnetic body 106*a* for fixing the height of the first gap 108. In one embodiment, the first conductive wire comprises a plurality of first winding turns. In one embodiment, the second conductive wire comprises a plurality of second winding turns. In one embodiment, a second magnetic body 106*b* encapsulates the at least one first winding turn of the first conductive wire 103 and the first pillar 101*a*.

Figure 2A:
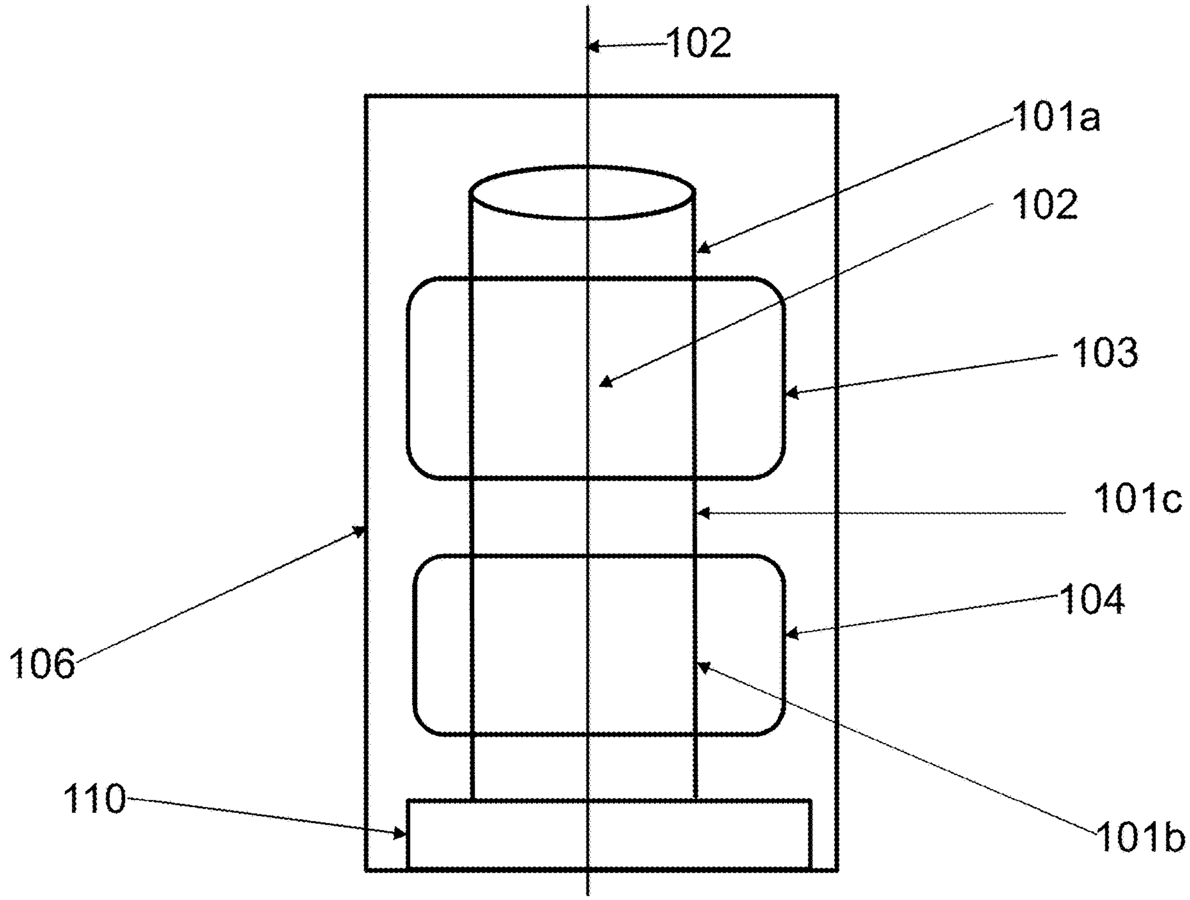
FIGS. 2A-2D each shows a view of a coupled inductor according to one embodiment of the present invention.

FIG. 2A shows a view of a coupled inductor according to one embodiment of the present invention. As shown in FIG. 2A, the coupled inductor comprises a first coil, comprising at least one first winding turn of a first conductive wire 103; and a second coil, comprising at least one second winding turn of a second conductive wire 104, wherein the at least one first winding turn of the first conductive wire 103 and the at least one second winding turn of a second conductive wire 104 are respectively wound around a first pillar 101*a* and a second pillar 101*b*, wherein the second pillar 101*b* is on a top surface of a magnetic plate 110, wherein the second pillar 101*b* and the magnetic plate 110 can be integrally formed as a first T-core. The bottom surface of the at least one first winding turn and the top surface of the at least one second winding turn are separated by a first gap 108, wherein a magnetic material 101*c* is disposed in the first gap and a straight line 102 that is enclosed by each of the first coil and the second coil passes through both of the first pillar 101*a* and the second pillar 101*b*, that is, the straight line 102 passes through the hollow space of each of the first coil and the second coil. As shown in FIG. 2A, the first pillar 101*a* and the second pillar 101*b* are integrally formed so that the middle portion of the pillar 101*c* is disposed in the first gap 108. In one embodiment, the first conductive wire comprises a plurality of first winding turns. In one embodiment, the second conductive wire comprises a plurality of second winding turns. Please note that said pillars are made of a magnetic material; therefore, said magnetic material is disposed in the first gap 108. In one embodiment, a magnetic body 106 encapsulates the at least one first winding turn of the first conductive wire 103 and the at least one second winding turn of a second conductive wire 104 and said pillars. In one embodiment, the first pillar and the second pillar are integrally formed with the magnetic plate as a T-core, and the plurality of first winding turns of the first conductive wire and the plurality of second winding turns of the second conductive wire, and the first T-core are encapsulated by magnetic body 106.

Figure 2B:
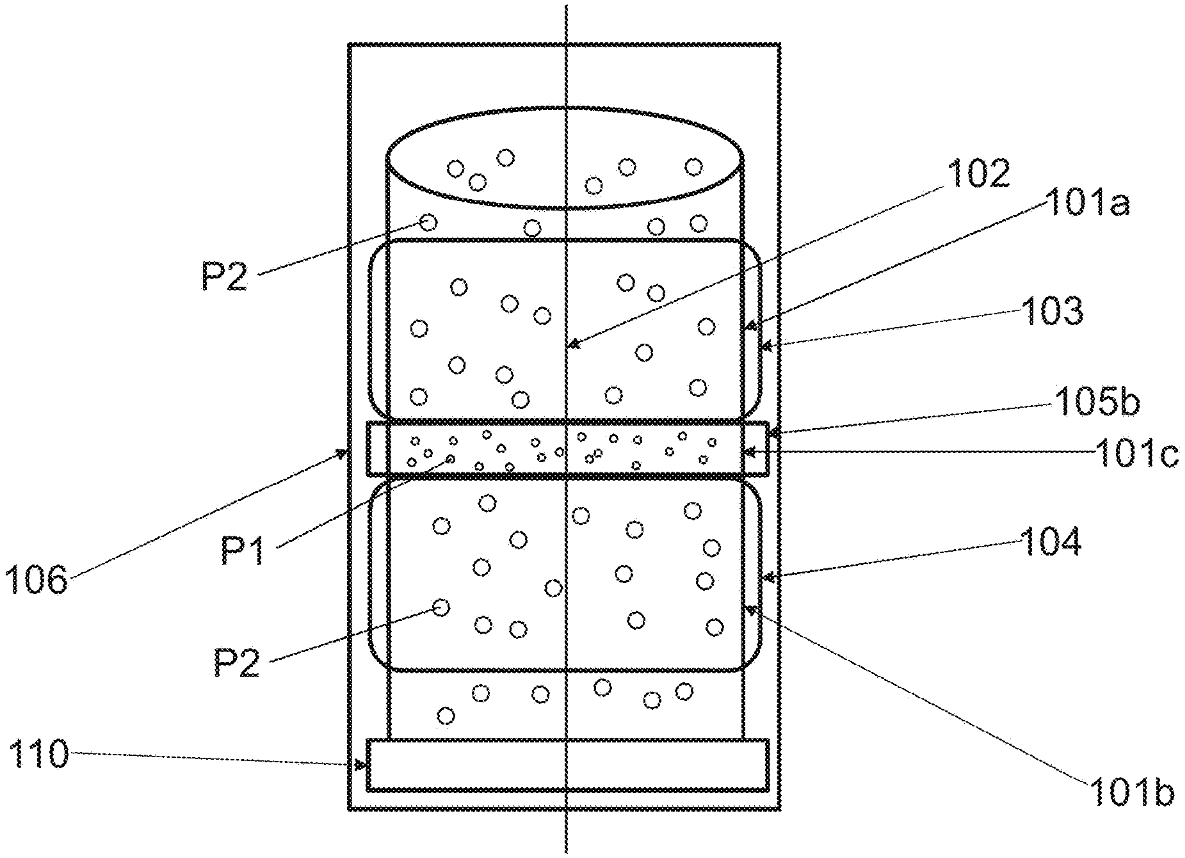

FIG. 2B shows a view of a coupled inductor according to one embodiment of the present invention. As shown in FIG. 2B, the coupled inductor comprises a first coil, comprising at least one first winding turn of a first conductive wire 103; and a second coil, comprising at least one second winding turn of a second conductive wire 104, wherein the at least one first winding turn of the first conductive wire 103 and the at least one second winding turn of a second conductive wire 104 are respectively wound around a first pillar 101*a* and a second pillar 101*b*, respectively, wherein the second pillar 101*b* is on a top surface of a magnetic plate 110, wherein the second pillar 101*b* and the magnetic plate 110 can be integrally formed as a first T-core. The bottom surface of the at least one first winding turn and the top surface of the at least one second winding turn are separated by a first gap 108, wherein a magnetic material 101*c* is disposed in the first gap and a straight line 102 that is enclosed by each of the first coil and the second coil passes through both of the first pillar 101*a* and the second pillar 101*b*, that is, the straight line 102 passes through the hollow space of each of the first coil and the second coil. As shown in FIG. 2B, a magnetic material 105*b*, such as in a form of a magnetic sheet or a magnetic glue, surrounds the pillar 101*c* so as to support the at least one second winding turn of a second conductive wire 104 for fixing the height of the first gap 108. In one embodiment, the first conductive wire comprises a plurality of first winding turns. In one embodiment, the second conductive wire comprises a plurality of second winding turns. In one embodiment, the first coil, the second coil, the first T-core are encapsulated by a magnetic body. In one embodiment, the magnetic material 101*c* disposed in the first gap 108 comprises a first magnetic powder P1 and each of the first pillar 101*a* and the second pillar 101*b* comprises a second magnetic powder P2, wherein the average particle size of the first magnetic powder P1 is less than that of the second magnetic powder P2.

Figure 2C:
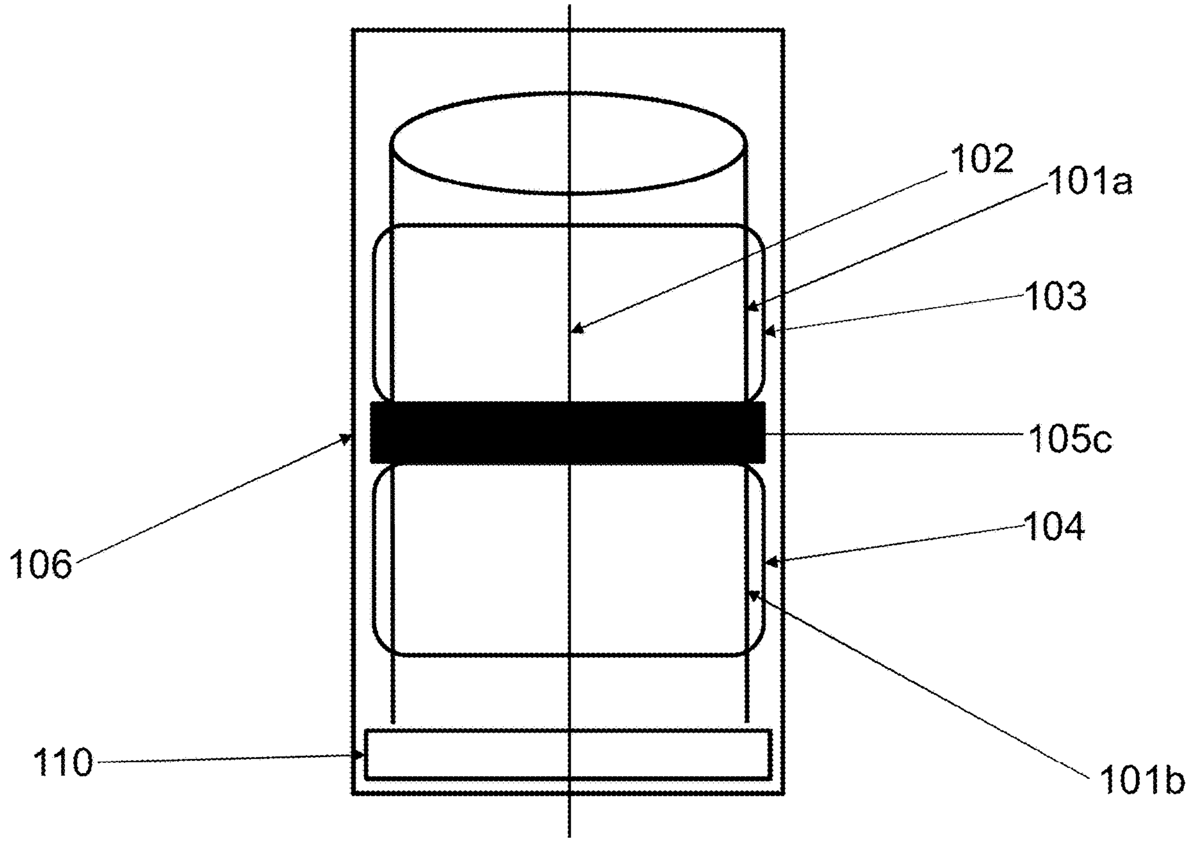

FIG. 2C shows a view of a coupled inductor according to one embodiment of the present invention. As shown in FIG. 2C, the coupled inductor comprises a first coil, comprising at least one first winding turn of a first conductive wire 103; and a second coil, comprising at least one second winding turn of a second conductive wire 104, wherein the at least one first winding turn of the first conductive wire 103 and the at least one second winding turn of a second conductive wire 104 are respectively wound around a first pillar 101*a* and a second pillar 101*b*, respectively, wherein the second pillar 101*b* is on a top surface of a magnetic plate 110, wherein the second pillar 101*b* and the magnetic plate 110 can be integrally formed as a first T-core. The bottom surface of the at least one first winding turn and the top surface of the at least one second winding turn are separated by a first gap 108, wherein a magnetic material 101*c* is disposed in the first gap and a straight line 102 that is enclosed by each of the first coil and the second coil passes through both of the first pillar 101*a* and the second pillar 101*b*, that is, the straight line 102 passes through the hollow space of each of the first coil and the second coil. As shown in FIG. 2C, a magnetic material 105*b*, such as in a form of a magnetic sheet or a magnetic glue, is disposed in the first gap 108. Please note that the first pillar 101*a* and the second pillar 101*b* are separated by a gap so that the magnetic material 105*b*, such as in a form of a magnetic sheet or a magnetic glue, can be disposed in the first gap 108 disposed between the first pillar 101*a* and the second pillar 101*b* for fixing the height of the first gap 108. In one embodiment, the first conductive wire comprises a plurality of first winding turns. In one embodiment, the second conductive wire comprises a plurality of second winding turns. In one embodiment, the plurality of first winding turns of the first conductive wire and the plurality of second winding turns of the second conductive wire, and the first T-core are encapsulated by magnetic body 106.

Figure 2D:
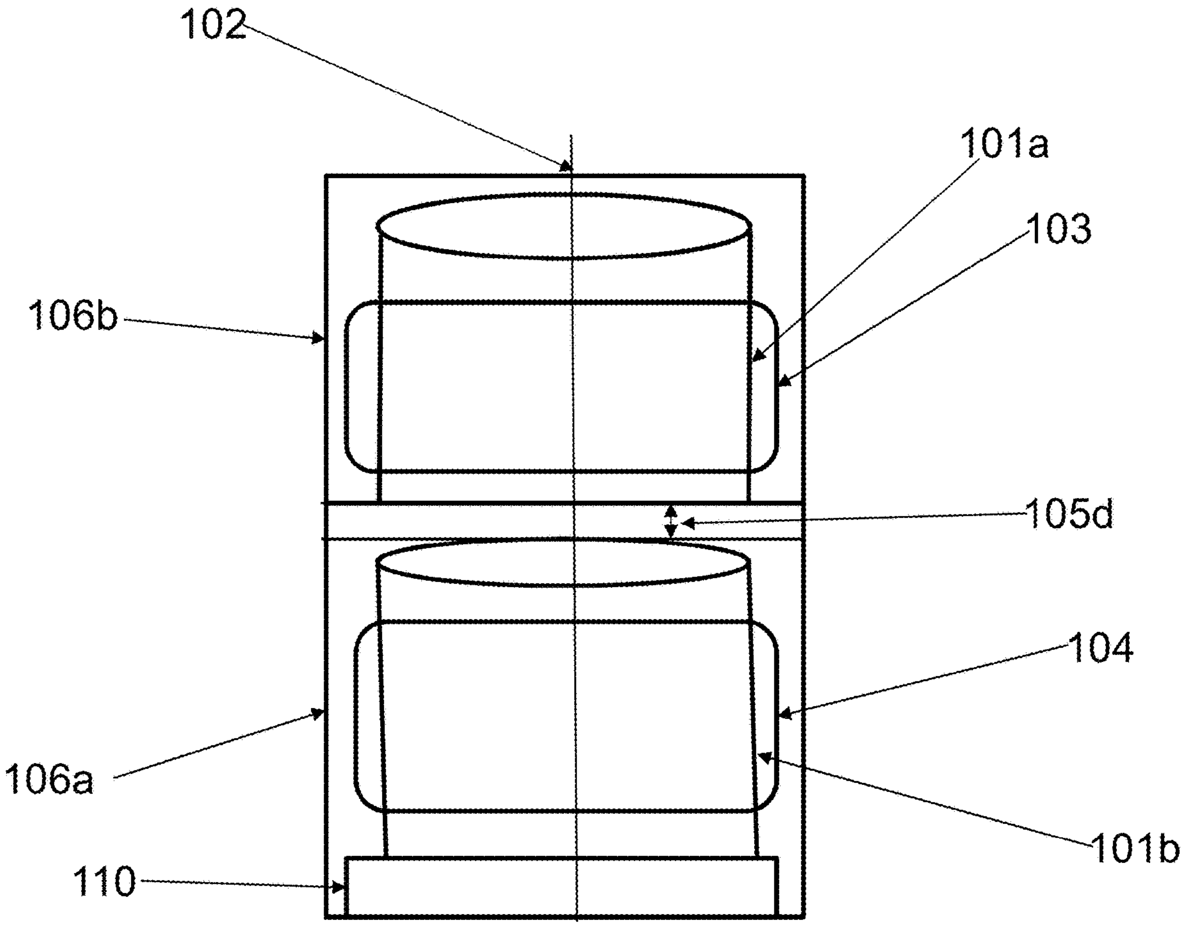

FIG. 2D shows a view of a coupled inductor according to one embodiment of the present invention. As shown in FIG. 2D, the coupled inductor comprises a first coil, comprising at least one first winding turn of a first conductive wire 103; and a second coil, comprising at least one second winding turn of a second conductive wire 104, wherein the at least one first winding turn of the first conductive wire 103 and the at least one second winding turn of a second conductive wire 104 are respectively wound around a first pillar 101*a* and a second pillar 101*b*, respectively, wherein the second pillar 101*b* is on a top surface of a magnetic plate 110, wherein the second pillar 101*b* and the magnetic plate 110 can be integrally formed as a first T-core. The bottom surface of the at least one first winding turn and the top surface of the at least one second winding turn are separated by a first gap 108, wherein a magnetic material 101*c* is disposed in the first gap and a straight line 102 that is enclosed by each of the first coil and the second coil passes through both of the first pillar 101*a* and the second pillar 101*b*, that is, the straight line 102 passes through the hollow space of each of the first coil and the second coil. As shown in FIG. 2D, a top part 105*d* of a first magnetic body 106*a* made of a magnetic material is disposed in the first gap 108, wherein the first magnetic body 106*a* encapsulates the second pillar 101*b* and the least one second winding turn of the second conductive wire 104, wherein the first pillar 101*a* and the at least one first winding turn of the first conductive wire 103 are located over the top part 105*d* of the first magnetic body 106*a*. Please note that the first pillar 101*a* and the second pillar 101*b* are separated by the height of the top part 105*d* of the first magnetic body 106*a* for fixing the height of the first gap 108. In one embodiment, the first conductive wire comprises a plurality of first winding turns. In one embodiment, the second conductive wire comprises a plurality of second winding turns. In one embodiment, a second magnetic body 106*b* encapsulates the at least one first winding turn of the first conductive wire 103 and the first pillar 101*a*. In one embodiment, the first pillar 101*a* is on a top surface of the first magnetic body 106*a* and is integrally formed with the first magnetic body 106*a*.

Figure 3A:
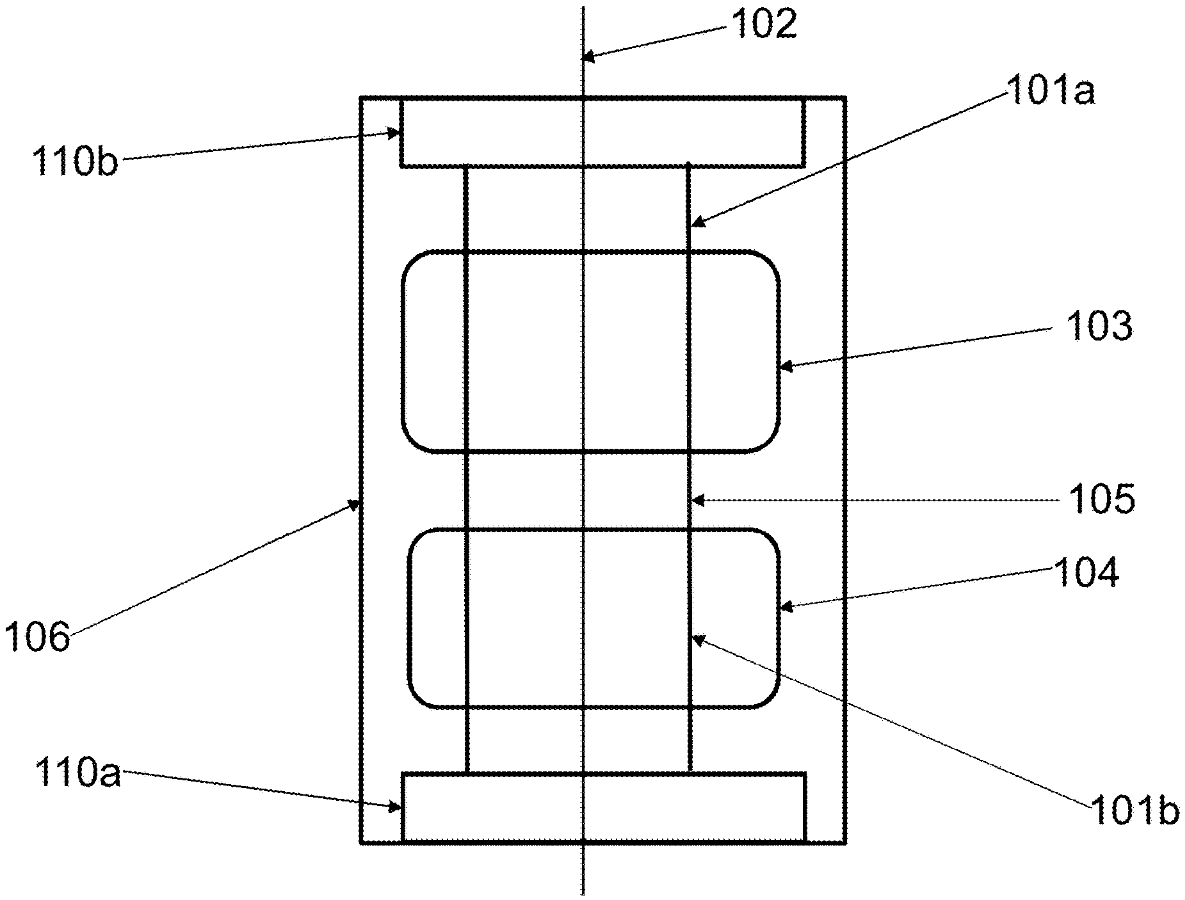
FIGS. 3A-3D each shows a view of a coupled inductor according to one embodiment of the present invention.

FIG. 3A shows a view of a coupled inductor according to one embodiment of the present invention. As shown in FIG. 3A, the coupled inductor comprises a first coil, comprising at least one first winding turn of a first conductive wire 103; and a second coil, comprising at least one second winding turn of a second conductive wire 104, wherein the at least one first winding turn of the first conductive wire 103 and the at least one second winding turn of a second conductive wire 104 are respectively wound around a first pillar 101*a* and a second pillar 101*b*, respectively, wherein the second pillar 101*b* is disposed between a magnetic plate 110*a* and a magnetic plate 110*b*. Please note that the first pillar 101*a*, the second pillar 101*b* and the magnetic plate 110*a* and the magnetic plate 110*b* can be integrally formed as an I-core. The bottom surface of the at least one first winding turn and the top surface of the at least one second winding turn are separated by a first gap 108, wherein a magnetic material 101*c* is disposed in the first gap and a straight line 102 that is enclosed by each of the first coil and the second coil passes through both of the first pillar 101*a* and the second pillar 101*b*, that is, the straight line 102 passes through the hollow space of each of the first coil and the second coil. As shown in FIG. 3A, the first pillar 101*a* and the second pillar 101*b* are integrally formed so that the middle portion of the pillar 101*c* is disposed in the first gap 108. In one embodiment, the first conductive wire comprises a plurality of first winding turns. In one embodiment, the second conductive wire comprises a plurality of second winding turns. Please note that said pillars are made of a magnetic material; therefore, a magnetic material is disposed in the first gap 108. In one embodiment, a magnetic body 106 encapsulates the at least one first winding turn of the first conductive wire 103 and the at least one second winding turn of a second conductive wire 104 and said pillars. In one embodiment, the plurality of first winding turns of the first conductive wire and the plurality of second winding turns of the second conductive wire, and the I-core are encapsulated by magnetic body 106.

Figure 3B:
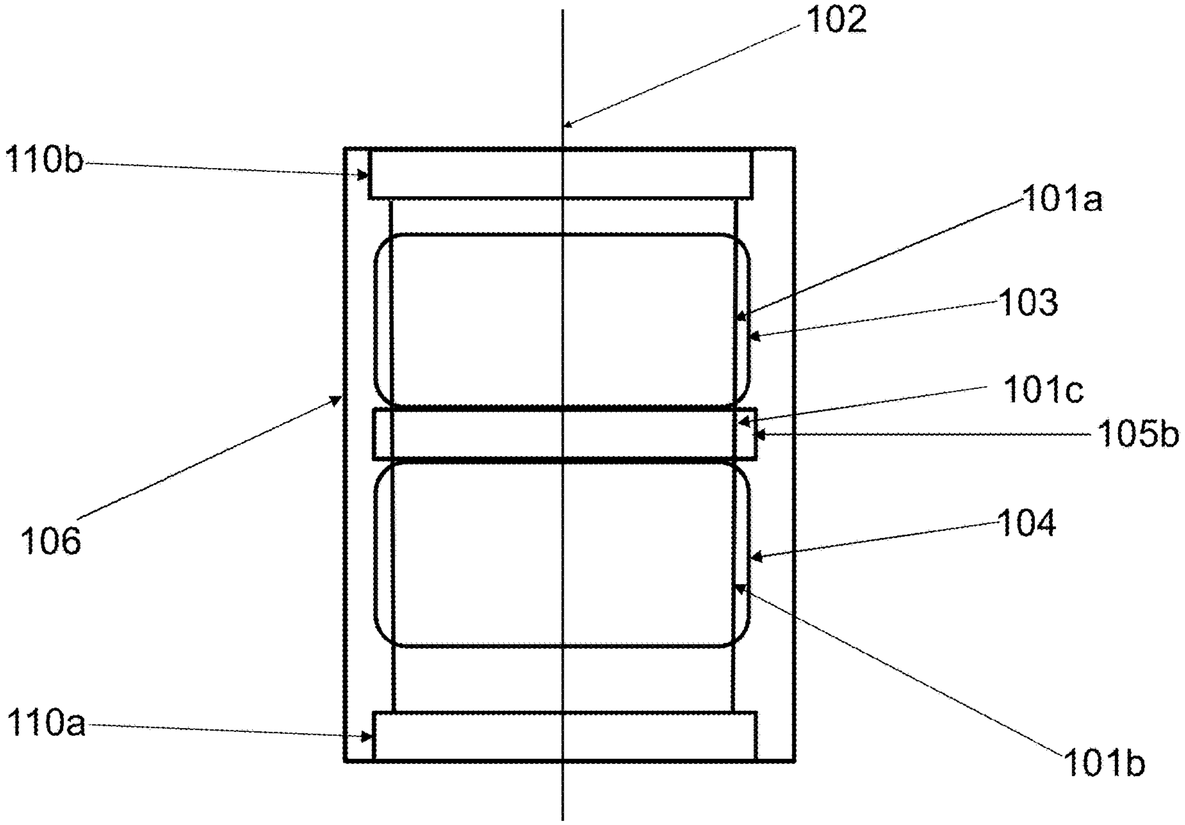

FIG. 3B shows a view of a coupled inductor according to one embodiment of the present invention. As shown in FIG. 3B, the coupled inductor comprises a first coil, comprising at least one first winding turn of a first conductive wire 103; and a second coil, comprising at least one second winding turn of a second conductive wire 104, wherein the at least one first winding turn of the first conductive wire 103 and the at least one second winding turn of a second conductive wire 104 are respectively wound around a first pillar 101*a* and a second pillar 101*b*, respectively, wherein the second pillar 101*b* is disposed between a magnetic plate 110*a* and a magnetic plate 110*b*. Please note that the first pillar 101*a*, the second pillar 101*b* and the magnetic plate 110*a* and the magnetic plate 110*b* can be integrally formed as an I-core. The bottom surface of the at least one first winding turn and the top surface of the at least one second winding turn are separated by a first gap 108, wherein a magnetic material 101*c* is disposed in the first gap and a straight line 102 that is enclosed by each of the first coil and the second coil passes through both of the first pillar 101*a* and the second pillar 101*b*, that is, the straight line 102 passes through the hollow space of each of the first coil and the second coil. As shown in FIG. 3B, a magnetic material 105*b*, such as in a form of a magnetic sheet or a magnetic glue, surrounds the pillar 101*c* so as to support the at least one second winding turn of a second conductive wire 104 for fixing the height of the first gap 108. In one embodiment, the first conductive wire comprises a plurality of first winding turns. In one embodiment, the second conductive wire comprises a plurality of second winding turns. In one embodiment, the plurality of first winding turns of the first conductive wire and the plurality of second winding turns of the second conductive wire, and the I-core are encapsulated by magnetic body 106.

Figure 3C:
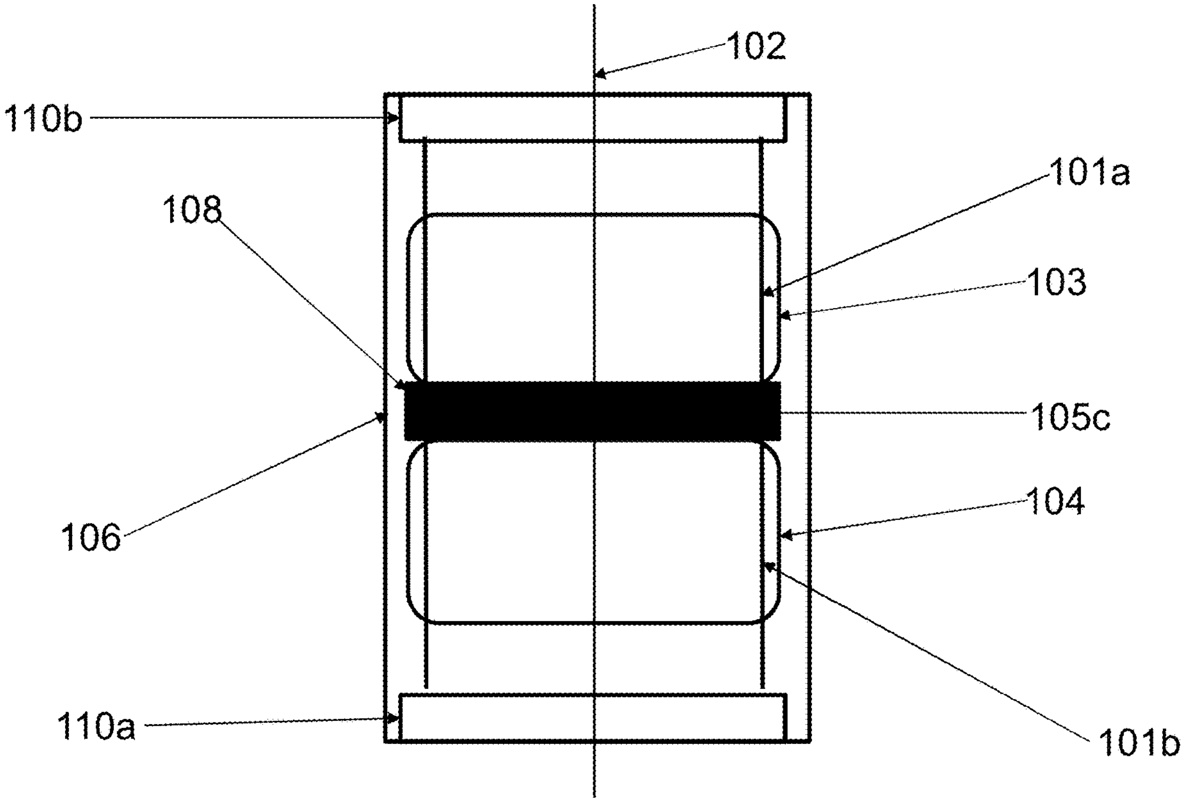

FIG. 3C shows a view of a coupled inductor according to one embodiment of the present invention. As shown in FIG. 3C, the coupled inductor comprises a first coil, comprising at least one first winding turn of a first conductive wire 103; and a second coil, comprising at least one second winding turn of a second conductive wire 104, wherein the at least one first winding turn of the first conductive wire 103 and the at least one second winding turn of a second conductive wire 104 are respectively wound around a first pillar 101*a* and a second pillar 101*b*, respectively, wherein the second pillar 101*b* is on a top surface of a magnetic plate 110, wherein the second pillar 101*b* and the magnetic plate 110*a* can be integrally formed as a first T-core, and the first pillar 101*a* is on a top surface of a magnetic plate 110*b*, wherein the first pillar 101*a* and the magnetic plate 110*b* can be integrally formed as a second T-core. The bottom surface of the at least one first winding turn and the top surface of the at least one second winding turn are separated by a first gap 108, wherein a magnetic material 101*c* is disposed in the first gap and a straight line 102 that is enclosed by each of the first coil and the second coil passes through both of the first pillar 101*a* and the second pillar 101*b*, that is, the straight line 102 passes through the hollow space of each of the first coil and the second coil. As shown in FIG. 3C, a magnetic material 105*b*, such as in a form of a magnetic sheet or a magnetic glue, is disposed in the first gap 108. Please note that the first pillar 101*a* and the second pillar 101*b* are separated by a gap so that the magnetic material 105*b*, such as in a form of a magnetic sheet or a magnetic glue, can be disposed between the first pillar 101*a* and the second pillar 101*b* for fixing the height of the first gap 108. In one embodiment, the first conductive wire comprises a plurality of first winding turns. In one embodiment, the second conductive wire comprises a plurality of second winding turns. In one embodiment, the plurality of first winding turns of the first conductive wire and the plurality of second winding turns of the second conductive wire, and the first T-core and the second T-core are encapsulated by magnetic body 106.

Figure 3D:
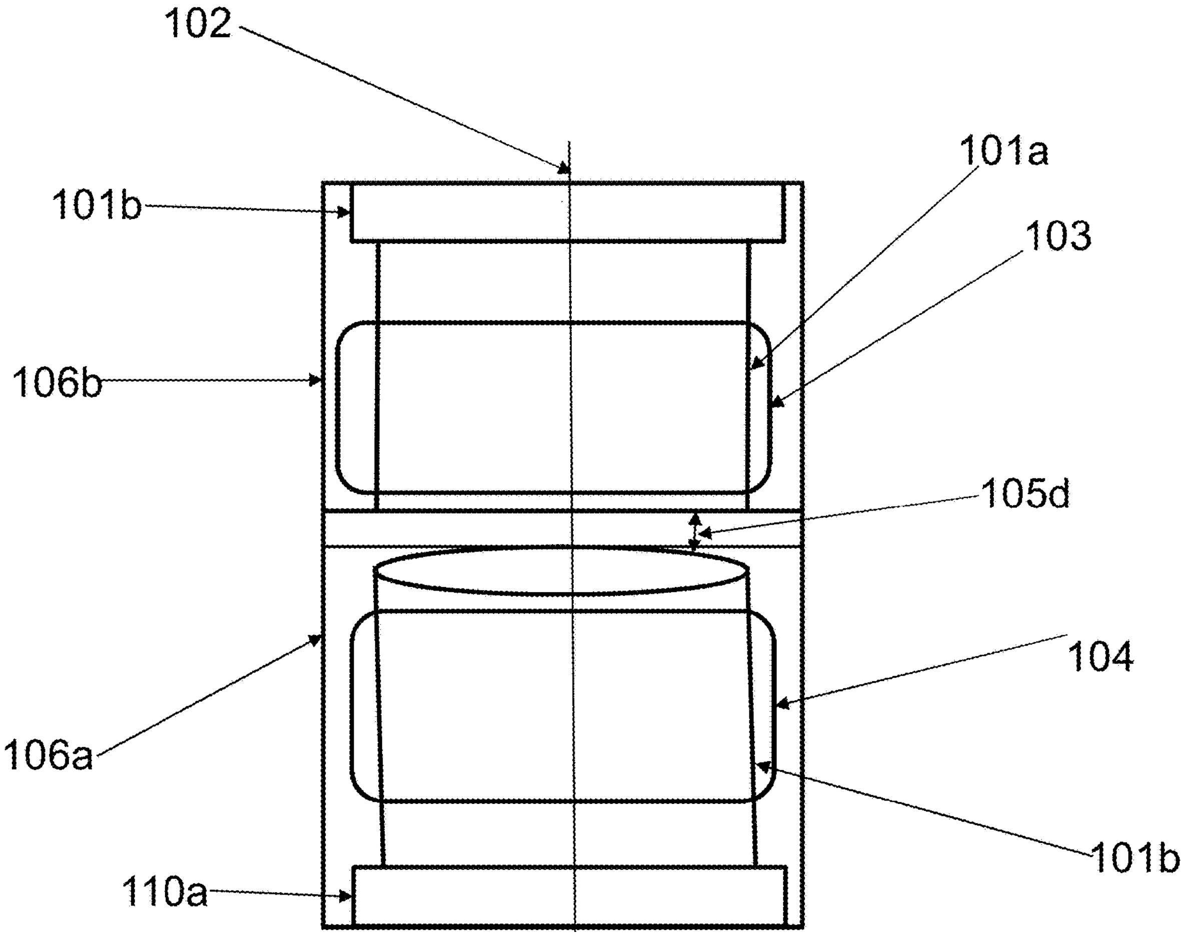

FIG. 3D shows a view of a coupled inductor according to one embodiment of the present invention. As shown in FIG. 3D, the coupled inductor comprises a first coil, comprising at least one first winding turn of a first conductive wire 103; and a second coil, comprising at least one second winding turn of a second conductive wire 104, wherein the at least one first winding turn of the first conductive wire 103 and the at least one second winding turn of a second conductive wire 104 are respectively wound around a first pillar 101*a* and a second pillar 101*b*, respectively, wherein the second pillar 101*b* and the magnetic plate 110*a* can be integrally formed as a first T-core, and the first pillar 101*a* is on a top surface of a magnetic plate 110*b*, wherein the first pillar 101*a* and the magnetic plate 110*b* can be integrally formed as a second T-core. The bottom surface of the at least one first winding turn and the top surface of at least one second winding turn are separated by a first gap 108, wherein a magnetic material 101*c* is disposed in the first gap and a straight line 102 that is enclosed by each of the first coil and the second coil passes through both of the first pillar 101*a* and the second pillar 101*b*, that is, the straight line 102 passes through the hollow space of each of the first coil and the second coil. As shown in FIG. 3D, a top part 105*d* of a magnetic body 106 made of a magnetic material is disposed in the first gap 108, wherein the magnetic body 106 encapsulates the second pillar 101*b* and the least one second winding turn of a second conductive wire 104, wherein the first pillar 101*a* and the at least one first winding turn of the first conductive wire 103 are located over the top part 105*d* of the magnetic body 106. Please note that the first pillar 101*a* and the second pillar 101*b* are separated by the height of the top part 105*d* of a magnetic body 106 for fixing the height of the first gap 108. In one embodiment, the first conductive wire comprises a plurality of first winding turns. In one embodiment, the second conductive wire comprises a plurality of second winding turns. In one embodiment, a second magnetic body 106*b* encapsulates the at least one first winding turn of the first conductive wire 103 and the second T-core.

Figure 4:
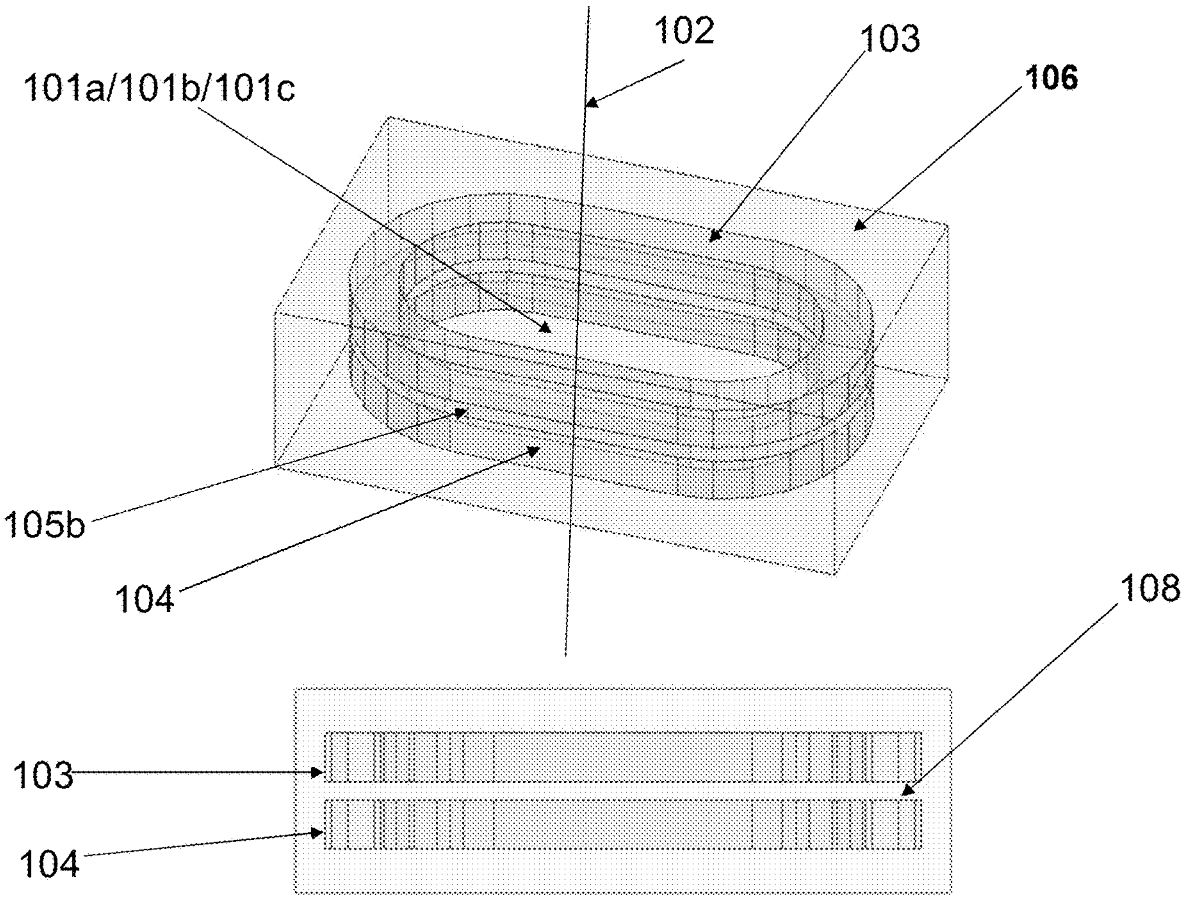
FIG. 4 shows a view of a coupled inductor according to one embodiment of the present invention.

FIG. 4 shows a view of a coupled inductor according to one embodiment of the present invention. As shown in FIG. 4, the first pillar 101*a* and the second pillar 101*b* are integrally formed with a magnetic body 106 that encapsulates the at least one first winding turn of a first conductive wire 103 and at least one second winding turn of a second conductive wire 104, wherein the bottom surface of the at least one first winding turn and the top surface of at least one second winding turn are separated by a first gap 108, wherein a straight line 102 that is enclosed by each of the first coil and the second coil passes through both of the first pillar 101*a* and the second pillar 101*b*, that is, the straight line 102 passes through the hollow space of each of the first coil and the second coil. As shown in FIG. 4, a magnetic material 105*b*, such as in a form of a magnetic sheet or a magnetic glue, surrounds the middle pillar 101*c* for fixing the height of the first gap 108. In one embodiment, the first conductive wire comprises a plurality of first winding turns. In one embodiment, the second conductive wire comprises a plurality of second winding turns. In one embodiment, a magnetic body encapsulates the first coil and the second coil and extends into the hollow space of each of the first coil and the second coil so as to form the first pillar 101*a* and the second pillar 101*b*.

In one embodiment, the first coil and the second coil of the present invention are inversed coupled and the coefficient of coupling (K) of the first coil and the second coil has a negative value In one embodiment, the axis of the first pillar and the axis of the second pillar of the present invention are substantially aligned along a vertical direction. In one embodiment, both of the axis of the first pillar and the axis of the second pillar of the present invention are on a same straight line. In one embodiment, both of the axis of the first pillar and the axis of the second pillar of the present invention have a distance therebetween and the distance is no more than 0.2 mm. In one embodiment, both of the axis of the first pillar and the axis of the second pillar of the present invention have a distance therebetween and the distance is no more than 0.1 mm.

In one embodiment, the first pillar and the second pillar are made of a first magnetic material and the magnetic material disposed in the first gap 108 is made of a second magnetic material, wherein the permeability of the second magnetic material is lower than that of the first magnetic material.

In one embodiment, the permeability of the magnetic material of the present invention disposed in the first gap 108 is respectively less than that of the first pillar 101*a* and the second pillar 101*b*. In one embodiment, said permeability of the magnetic material disposed in the first gap 108 is in the range: 12-18 and the permeability of the first pillar and the second pillar is in the range: 25-45.

In one embodiment, each of the first pillar and the second pillar of the present invention comprises iron powder.

In one embodiment, each of the first pillar and the second pillar of the present invention is made of iron powder.

In one embodiment, K of the present invention is in the range: −0.4 to −0.8. In one embodiment, K of the present invention is in the range: −0.5 to −0.8. In one embodiment, K of the present invention is in the range: −0.4 to −0.6. In one embodiment, K of the present invention is in the range: −0.4 to −0.6. In one embodiment, K of the present invention is in the range: −0.45 to −0.55.

In one embodiment, the vertical distance of the first gap 108 is in the range: 0.02 mm to 0.50 mm. In one embodiment, the vertical distance of the first gap 108 is in the range: 0.02 mm to 0.30 mm. In one embodiment, the vertical distance of the first gap 108 is in the range: 0.02 mm to 0.20 mm.

In one embodiment, the first coil of the present invention has a first terminal for inputting a first current and a second terminal for outputting the first current, and the second coil of the present invention has a third terminal for inputting a second current and a fourth terminal for outputting the second current, wherein the first terminal and the third terminal are electrically connected to a first lead and a second lead of the coupled inductor on a first side of an outer surface of the magnetic body, and the second terminal and fourth terminal are electrically connected to a third lead and a fourth lead of the coupled inductor on a second side of said outer surface opposite to said first side of said outer surface.

Figure 5A:
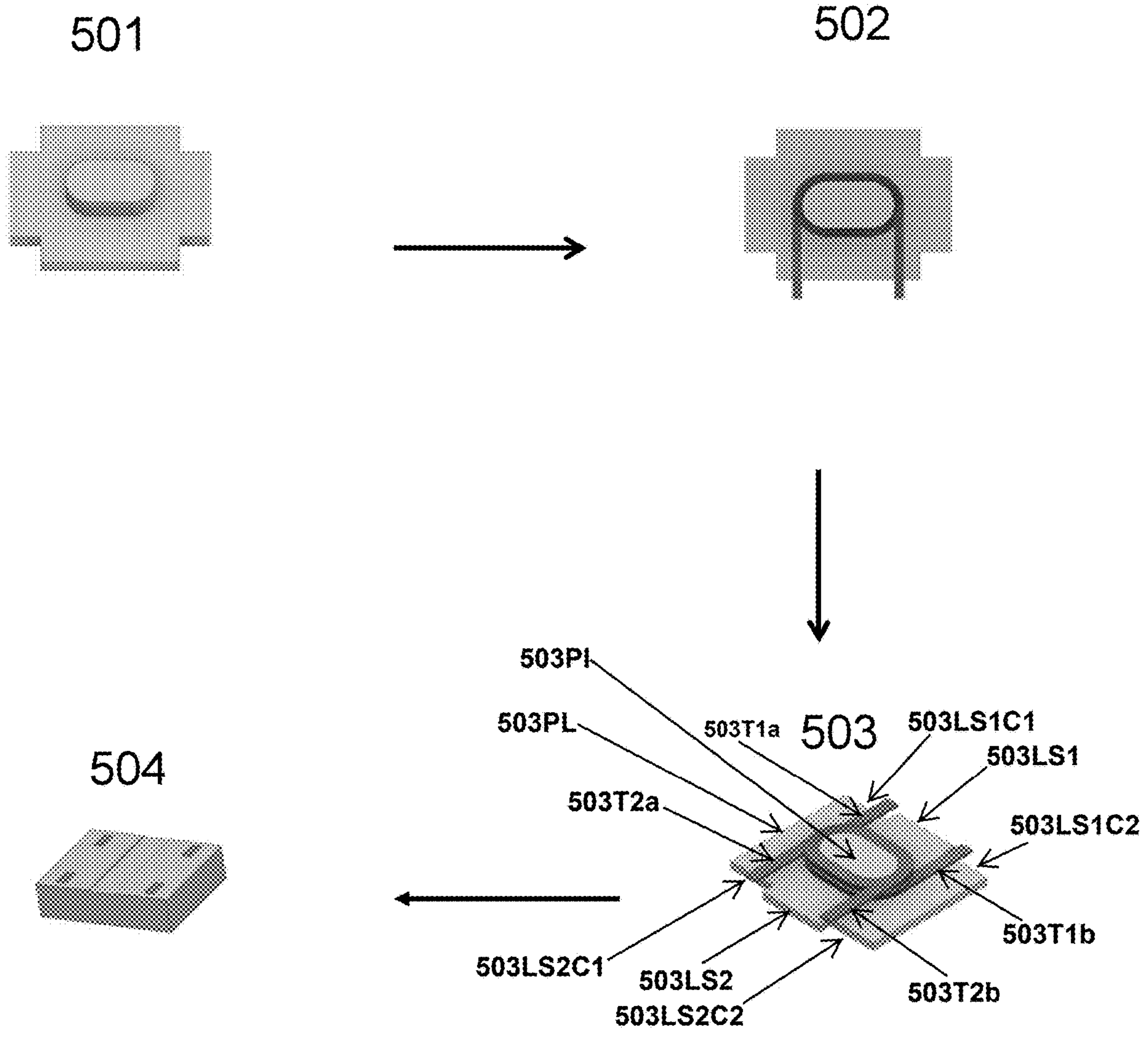
FIGS. 5A-5D each illustrate a method to form a coupled inductor according to one embodiment of the present invention.

FIG. 5A shows a method to form a coupled inductor according to one embodiment of the present invention. As shown in FIG. 5A, wherein in the step 501: a first coil comprising at least one first winding turn of a first conductive wire is wound around a lower portion of a pillar of a T-core, wherein the pillar is on a top surface of a magnetic plate so as to form the T-core, wherein the T-core can be integrally formed as a unitary magnetic body; in the step 502: a second coil comprising at least one second winding turn of a first conductive wire is wound around an upper portion of the pillar of the T-core, wherein the bottom surface of the at least one first winding turn and the top surface of the at least one second winding turn are separated by a first gap; in step 503: forming a magnetic body to encapsulate the at least one first winding turn of the first conductive wire and the at least one second winding turn of a second conductive wire 104 and the pillar of the T-core; and in step 504: forming electrodes on an outer surface of the magnetic body, wherein the first coil has a first terminal for inputting a first current and a second terminal for outputting the first current and the second coil has a third terminal for inputting a second current and a fourth terminal for outputting the second current, wherein the first terminal and the third terminal are electrically connected to a first lead and a second lead of the coupled inductor on a first side of an outer surface of the magnetic body, and the second terminal and fourth terminal are electrically connected to a third lead and a fourth lead of the coupled inductor on a second side of said outer surface opposite to said first side of said outer surface. As shown in FIG. 5A, there is a magnetic T-core comprising a magnetic plate 503PL and a first pillar 503P1, wherein each of a first terminal part 503T1*a* and a second terminal part 503T1*b* of the first conductive wire respectively extends toward a first side surface 503LS1 of the magnetic plate 503PL, and each of a first terminal part 503T2*a* and a second terminal part 503T2*b* of the second conductive wire respectively extends toward a second side surface 503LS2 of the magnetic plate 503PL, wherein the first side surface 503LS1 and the second side surface 503LS2 are two opposite side surfaces of the magnetic plate 503PL, wherein there are two opening 503LSTC1, 503LS1C2 formed on two opposite sides of the first side surface 503LS1, and there are two opening 503LS2C1, 503LS2C2 formed on two opposite sides of the second side surface 503LS2, wherein each of the first terminal part 503T1*a* and the second terminal part 503T1*b* of the first conductive wire is respectively bent onto a bottom surface of the magnetic plate 503PL via a corresponding opening 503LS1C1, 503LS1C2 formed on a corresponding corner of a magnetic plate 503PL, and wherein each of the first terminal part 503T2*a* and the second terminal part 503T2*b* of the second conductive wire is respectively bent onto a bottom surface of the magnetic plate 503PL via a corresponding opening 503LS2C1, 503LS2C2 formed on a corresponding corner of a magnetic plate 503PL.

Figure 5B:
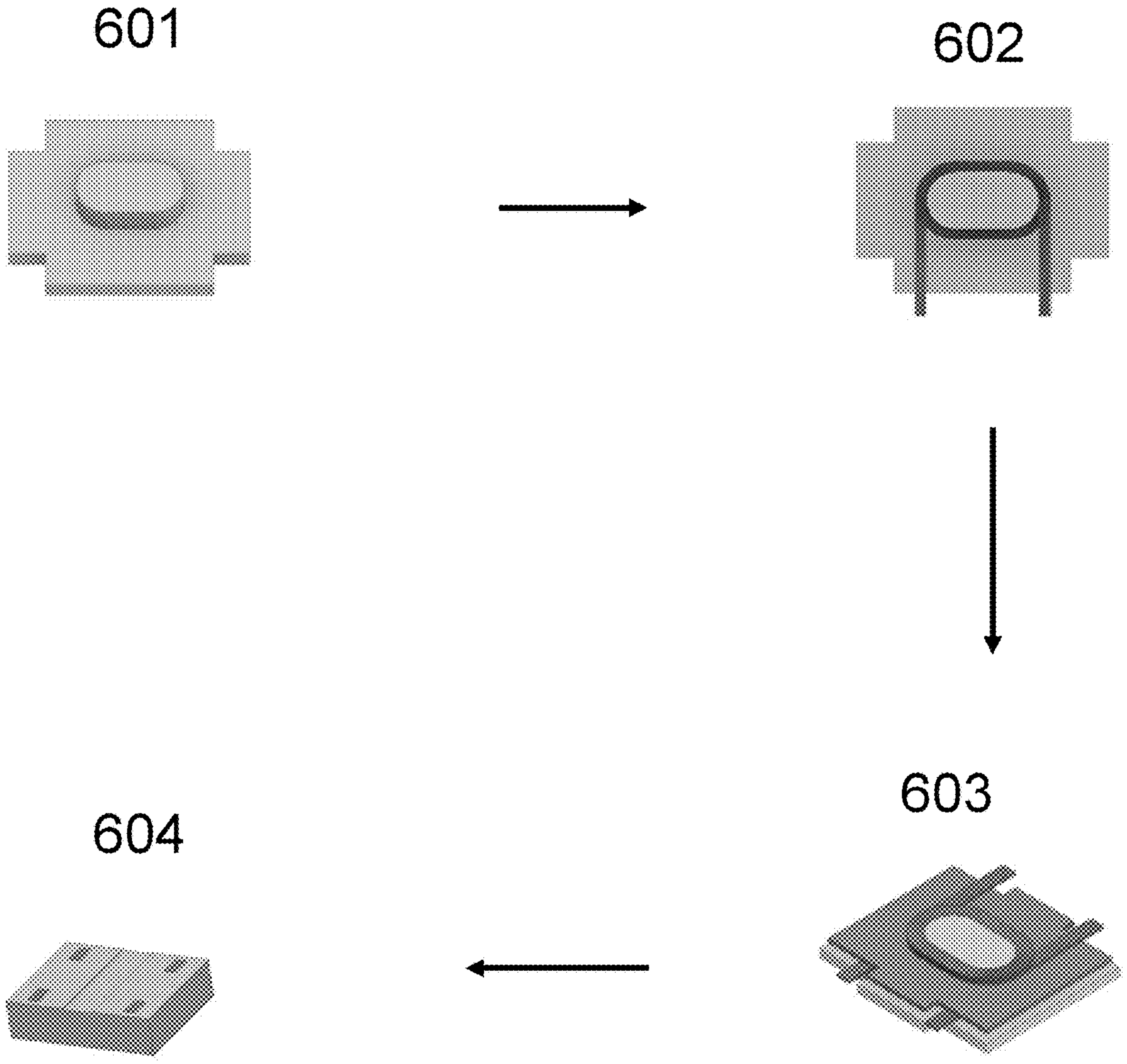

FIG. 5B shows a method to form a coupled inductor according to one embodiment of the present invention. As shown in FIG. 5B, wherein in the step 601: a first coil comprising at least one first winding turn of a first conductive wire is wound around a lower portion of a pillar of a T-core, wherein the pillar is on a top surface of a magnetic plate so as to form the T-core, wherein the T-core can be integrally formed as a unitary magnetic body; in the step 602: disposing a magnetic sheet on the first coil and surrounds the pillar and a second coil comprising at least one second winding turn of a first conductive wire is located above the magnetic sheet and wound around an upper portion of the pillar of the T-core, wherein the bottom surface of the at least one first winding turn and the top surface of at least one second winding turn are separated by a first gap, wherein the magnetic sheet can be used to fix the distance of the first gap; in step 603: forming a magnetic body to encapsulate the at least one first winding turn of the first conductive wire, the at least one second winding turn of a second conductive wire 104, the magnetic sheet and the pillar of the T-core; and in step 504: forming electrodes on an outer surface of the magnetic body, wherein the first coil has a first terminal for inputting a first current and a second terminal for outputting the first current and the second coil has a third terminal for inputting a second current and a fourth terminal for outputting the second current, wherein the first terminal and the third terminal are electrically connected to a first lead and a second lead of the coupled inductor on a first side of an outer surface of the magnetic body, and the second terminal and fourth terminal are electrically connected to a third lead and a fourth lead of the coupled inductor on a second side of said outer surface opposite to said first side of said outer surface.

Figure 5C:
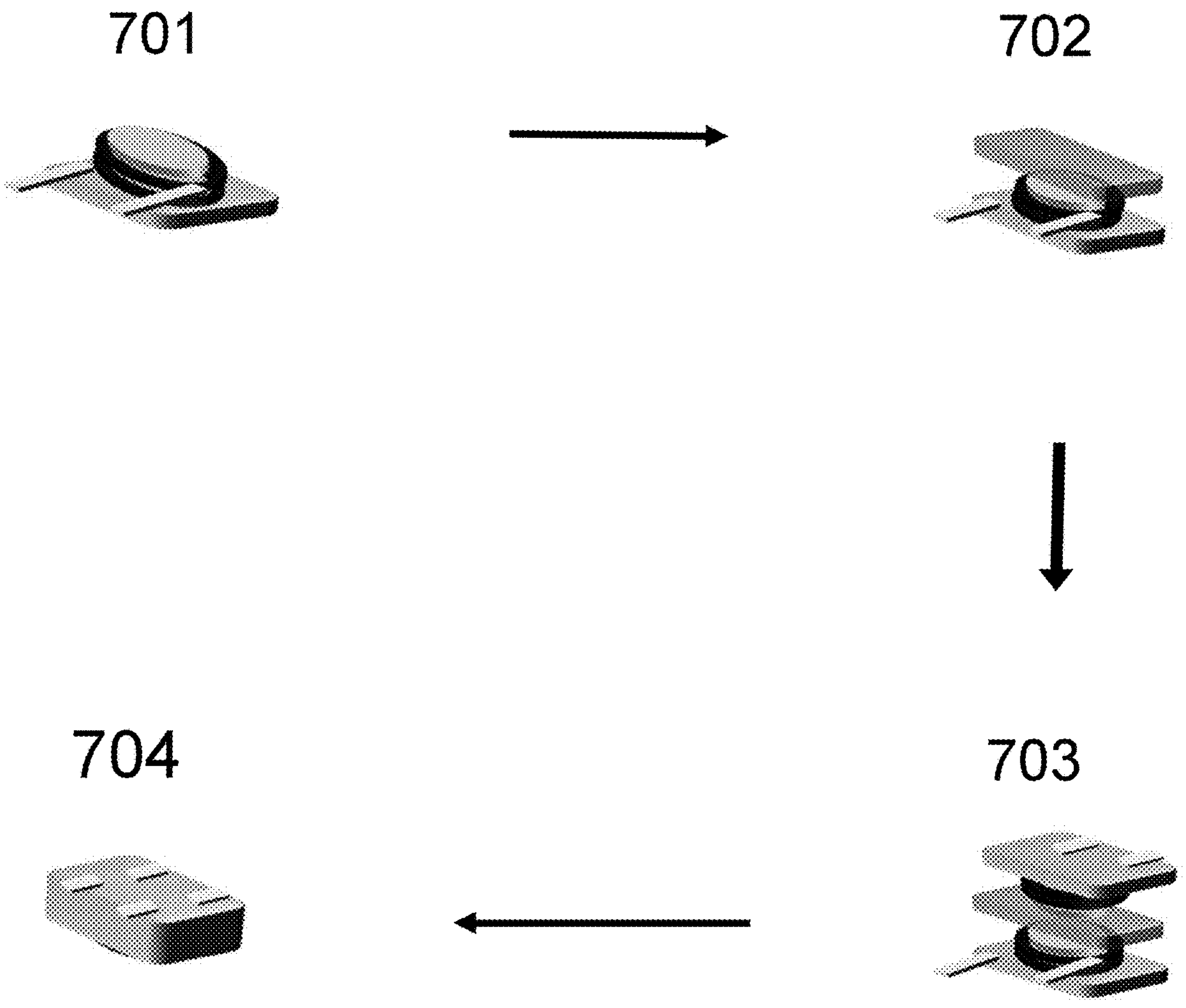

FIG. 5C shows a method to form a coupled inductor according to one embodiment of the present invention. As shown in FIG. 5C, wherein in the step 701: a first coil comprising at least one first winding turn of a first conductive wire is wound around a first pillar of a first T-core, wherein the T-core can be integrally formed as a unitary magnetic body; in the step 702: disposing a magnetic sheet on the top surface of the pillar of the first T-core; in step 703: a second coil comprising at least one first winding turn of a second conductive wire is wound around a second pillar of a second T-core, wherein the T-core can be integrally formed as a unitary magnetic body, wherein the at least one second winding turn of the second conductive wire is located above the magnetic sheet and wound around the second pillar of the second T-core of the T-core, wherein the bottom surface of the at least one first winding turn and the top surface of at least one second winding turn are separated by a first gap, wherein the magnetic sheet can be used to fix the distance of the first gap; in step 704: forming a magnetic body to encapsulate the at least one first winding turn of the first conductive wire, the at least one second winding turn of a second conductive wire 104, the magnetic sheet and the first pillar of the first T-core and the second pillar of the second T-core, wherein electrodes are disposed on an outer surface of the magnetic body, wherein the first coil has a first terminal for inputting a first current and a second terminal for outputting the first current and the second coil has a third terminal for inputting a second current and a fourth terminal for outputting the second current, wherein the first terminal and the third terminal are electrically connected to a first lead and a second lead of the coupled inductor on a first side of an outer surface of the magnetic body, and the second terminal and fourth terminal are electrically connected to a third lead and a fourth lead of the coupled inductor on a second side of said outer surface opposite to said first side of said outer surface.

Figure 5D:
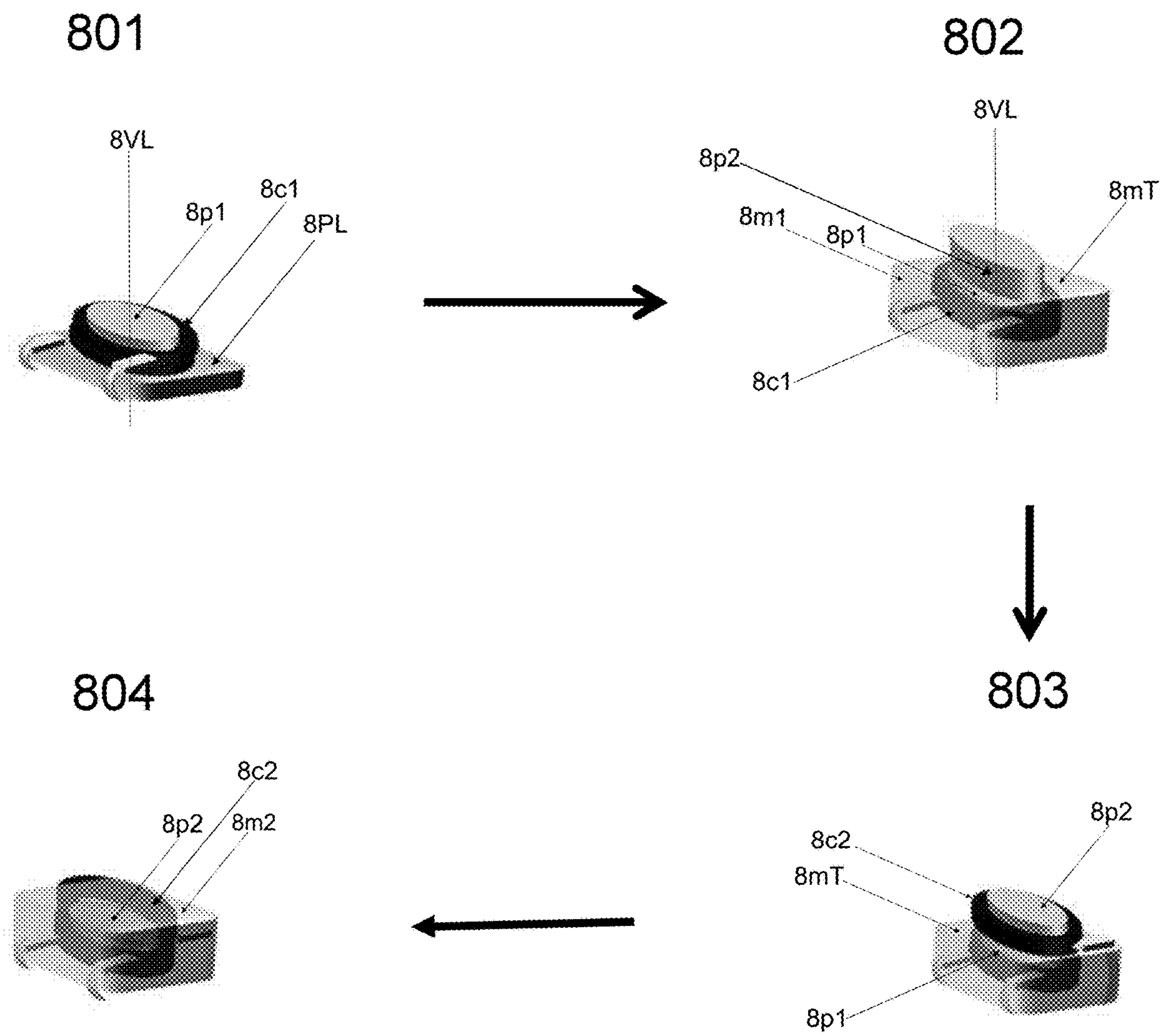

FIG. 5D shows a method to form a coupled inductor according to one embodiment of the present invention. As shown in FIG. 5D, wherein in the step 801: a first coil 8*c*1 comprising at least one first winding turn of a first conductive wire is wound around a first pillar 8*pi* of a first T-core formed by a magnetic plate 8PL and the first pillar 8*p*1, wherein the T-core can be integrally formed as a unitary magnetic body; in the step 802: forming a first magnetic body 8*m*1 to encapsulate the first pillar 8*pi* and the least one first winding turn of the first conductive wire, wherein a second pillar 8*p*2 is formed on a top surface 8*m*T of the first magnetic body 8*m*1, wherein the second pillar 8*p*2 and the first magnetic body 8*m*1 can be integrally formed as a unitary body, wherein a vertical line 8VL passes through the first pillar 8*p*1, the second pillar 8*p*2, and the first magnetic plate 8PL; in the step 803: a second coil 8*c*2 comprising at least one second winding turn of a second conductive wire is wound around the second pillar 8*p*2; in the step 804: forming a second magnetic body 8*m*2 to encapsulate the at least one second winding turn of the second conductive wire and the second pillar 8*p*2.

Please note that the first pillar and the second pillar of the present invention can be placed along a vertical direction or along a horizontal direction, in either way to place the pillars, a straight line that is enclosed by each of the first coil and the second coil will pass through the first pillar and the second pillar, that is, the straight line passes through the hollow space of each of the first coil and the second coil.

Although the present invention has been described with reference to the above embodiments, it will be apparent to one of ordinary skill in the art that modifications to the described embodiment may be made without departing from the spirit of the invention. Accordingly, the scope of the invention will be defined by the attached claims not by the above-detailed descriptions.

What is claimed is:

1. A coupled inductor, comprising:

a magnetic T-core, comprising a magnetic plate and a pillar, wherein a first opening, a second opening, a third opening and a fourth opening are formed on a first corner, a second corner, a third corner and a fourth corner of the magnetic plate, respectively, wherein the first corner and the second corner are on a first side of the magnetic plate, and the third corner and the fourth corner are on a second side of the magnetic plate, wherein the first side and the second side are two opposite sides of the magnetic plate;

a first coil, comprising at least one first winding turn of a first conductive wire;

a second coil, comprising at least one second winding turn of a second conductive wire; and a magnetic material disposed between the first coil and the second coil, wherein the at least one first winding turn of the first conductive wire and the at least one second winding turn of the second conductive wire are respectively wound around the pillar, wherein a vertical line passes through the pillar with each of the at least one first winding turn and each of the at least one second winding turn being respectively wound around the vertical line; and wherein each of a first terminal part and a second terminal part of the first conductive wire respectively extends toward the first opening and the second opening of the magnetic plate, and each of a first terminal part and a second terminal part of the second conductive wire respectively extends toward the third opening and the fourth opening of the magnetic plate, wherein each of the first terminal part and the second terminal part of the first conductive wire is respectively bent onto a bottom surface of the magnetic plate via the first opening and the second opening of the magnetic plate; and wherein each of the first terminal part and the second terminal part of the second conductive wire is respectively bent onto the bottom surface of the magnetic plate via the third opening and the fourth opening of the magnetic plate, wherein the pillar comprises a first pillar and a second pillar spaced from the first coil by a gap, the first coil surrounds the first pillar, the second coil surrounds the second pillar, and the magnetic material is disposed in the gap, wherein a permeability of the first pillar and the second pillar is in a range from 25 to 45, wherein the magnetic material comprises a first magnetic powder and each of the first pillar and the second pillar comprises a second magnetic powder, and an average particle size of the first magnetic powder is less than an average particle size of the second magnetic powder.

2. The coupled inductor according to claim 1, wherein the first coil and the second coil are inversed coupled and the coefficient of coupling (K) of the first coil and the second coil has a negative value.

3. The coupled inductor according to claim 2, wherein K is in the range: −0.4 to −0.8.

4. The coupled inductor according to claim 1, further comprising a magnetic body encapsulating the at least one first winding turn, the at least one second winding turn, and the pillar.

5. The coupled inductor according to claim 1, wherein the magnetic plate is integrally formed with the pillar.

6. The coupled inductor according to claim 1, wherein the magnetic material is a magnetic sheet or a magnetic glue.

7. The coupled inductor according to claim 1, wherein the magnetic material surrounds the pillar and contacts a bottom surface of the first coil and a top surface of the second coil.

8. The coupled inductor according to claim 1, wherein the pillar further comprises a middle pillar disposed between the first pillar and the second pillar, the first terminal part of the first conductive wire is disposed adjacent the middle pillar, and the second terminal part of the first conductive wire is disposed adjacent the magnetic plate.

9. The coupled inductor according to claim 1, wherein the first terminal part and the second terminal part of the first conductive wire are parallel extended on the magnetic plate in a first direction, and the first terminal part and the second terminal part of the second conductive wire are parallel extended on the magnetic plate in a second direction that is opposite to the first direction.

* * * * *